Patented Dec. 12, 1922.

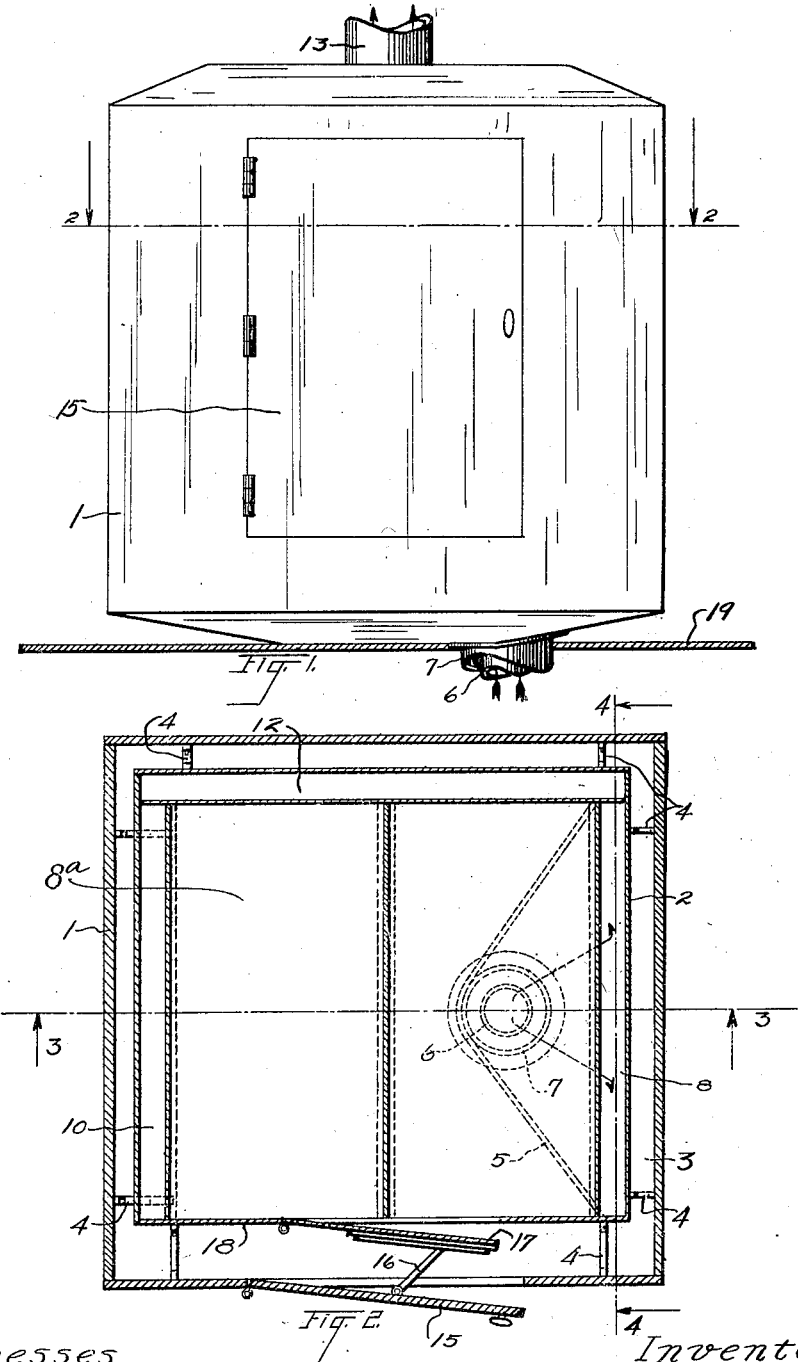

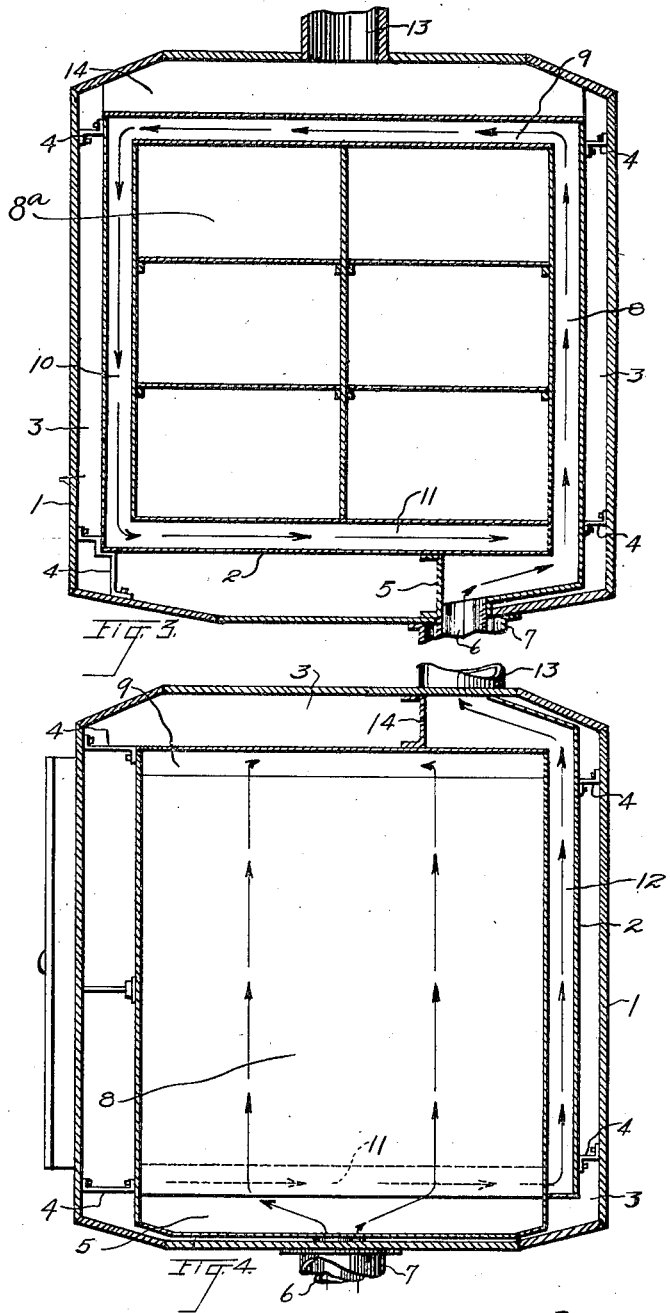

1,438,450

UNITED STATES PATENT OFFICE.

JOHN MAKI, OF VIRGINIA, MINNESOTA.

REFRIGERATOR.

Application filed April 12, 1919. Serial No. 289,713.

*To all whom it may concern:*

Be it known that I, JOHN MAKI, a citizen of Finland, residing at Virginia, St. Louis County, State of Minnesota, have invented certain new and useful Improvements in Refrigerators, of which the following is a specification.

This invention relates to improvements in air cooled refrigerators and its object is to provide such a refrigerator that is of very simple construction, cheap to manufacture and efficient in operation. With the foregoing and other objects in view the invention consists in the combination and arrangement of parts to be hereinafter fully described, pointed out in the appended claim and illustrated in the accompanying drawings which form a part of this specification and in which—

Fig. 1 is a view of my improved refrigerator in front elevation.

Fig. 2 is a cross section on line 2—2 of Fig. 1.

Fig. 3 is a vertical section on line 3—3 of Fig. 2.

Fig. 4 is a vertical section on line 4—4 of Fig. 2.

Like reference characters denote corresponding parts throughout the several views.

The reference numeral 1 denotes the outer casing and 2 the inner casing spaced away from the casing 1 to form the dead air space 3, the casings 1 and 2 being connected by the angular supports 4. A baffle plate 5 also connects the casings 1, 2 and prevents the incoming air received from the intake pipe 6, leading into the casing 1 and spaced away from the pipe casing 7, from entering the dead air space 3. The intake pipe 6 communicates with a series of air passages that partially surround the inner partitioned safe 8ª that contains the stock to be cooled. The first of the series of air passages is the passage 8 receiving the incoming air direct from the pipe 6, said passage 8 communicating directly with the air passage 9 which communicates directly with the air passage 10 which communicates directly with the air passage 11 which communicates directly with the air passage 12 that leads to the exhaust pipe 13 that may be connected direct to a chimney or that leads into the outer atmosphere through the roof of the building, a second baffle plate 14 connects the casings 1 and 2 at the top of the device, said baffle plate 14 also serving to keep the circulating air out of the dead air space 3. The air passage 12 is larger than any other single air passage in order to create a draft and stimulate the air circulation and the exhaust pipe 13 is larger than the intake pipe 6 for the same reason.

The outer casing is provided with a door 15 that is connected by rod 16 with a door 17 in the casing and safe, said members being formed with a common front wall 18 and when the door 15 is open access is had to the several compartments of the safe 8ª. It will be seen that the circulating air passes entirely about the safe 8ª except over its front face which is the wall 18. My refrigerator is portable and is designed to stand upon the floor 19 of a building, the pipe 6 and pipe casing 7 extending therethrough to the cellar of the building. The intake pipe 6 takes in cold air from the house cellar which air is always colder than the outer atmosphere, in warm weather, or than the atmosphere of the living rooms in the house. The pipe 13 leading either to the chimney or out through the roof of the building has its outer or free end disposed in a relatively warm atmosphere whereby a draft through the several connected air passages is created and a suction in the intake pipe created which draws in the cold air. The relatively cold air passing through the air passages and about the safe chills the same and so the device performs the function of a refrigerator.

What is claimed is:—

In a portable refrigerator, an outer casing, an inner casing supported therein in spaced relation therefrom to form a dead air space, an air intake pipe extending through said outer casing into the inner casing, a baffle adjacent said intake pipe to prevent air from entering the dead air space, said baffle serving as a support for the inner casing, an outlet pipe extending through said outer casing into the inner casing and of larger cross section than the intake pipe, a baffle adjacent said outlet pipe to prevent air from entering said dead air space, said last named baffle serving as a support for the inner casing, a safe supported in said inner casing in such manner as to form with the walls of the inner casing a continuous air passage around the top, bottom, back and sides of the safe, and simultaneously operable doors in said outer casing and front of the safe.

In testimony that I claim the foregoing as my own I have hereto affixed my signature in the presence of two subscribing witnesses.

JOHN MAKI.

Witnesses:
A. S. NEWSHAM,
E. R. LAMPE.